Aug. 11, 1931  F. H. BOWMAN ET AL  1,818,787
SYNCHRONOSCOPE
Filed Sept. 16, 1929  3 Sheets-Sheet 1
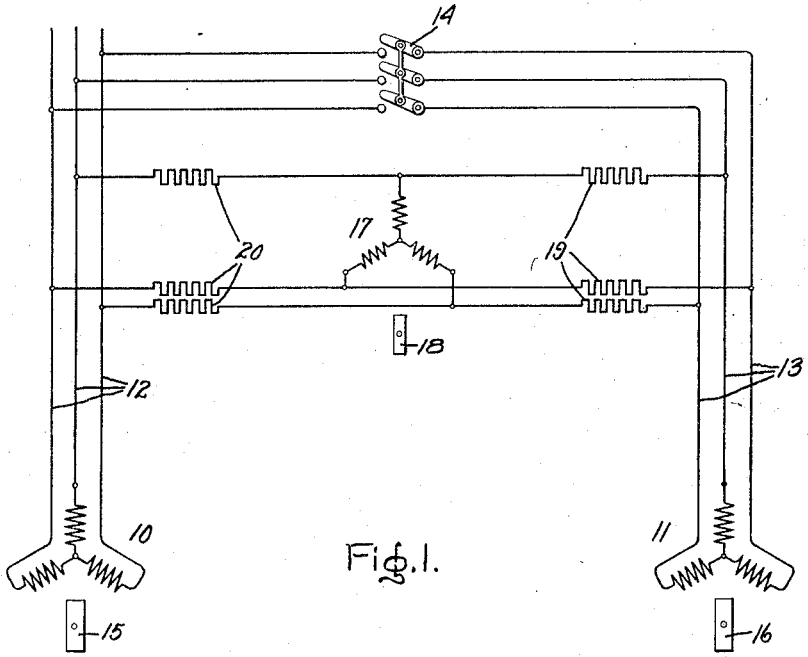
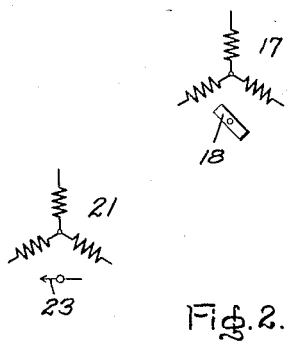
Fig.2.
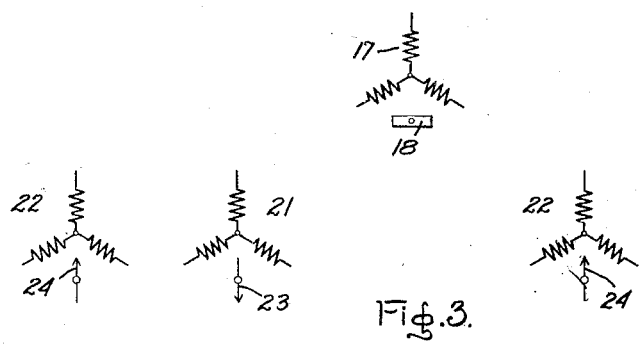
Fig.3.
Inventors:
Francis H. Bowman,
Edward Lynch,
David R. Price,
by Charles E. Mullar
Their Attorney.

Aug. 11, 1931.  F. H. BOWMAN ET AL  1,818,787
SYNCHRONOSCOPE
Filed Sept. 16, 1929   3 Sheets-Sheet 2

Inventors:
Francis H. Bowman,
Edward Lynch,
David R. Price,
by Charles E. Mullan
Their Attorney.

Aug. 11, 1931.  F. H. BOWMAN ET AL  1,818,787
SYNCHRONOSCOPE
Filed Sept. 16, 1929   3 Sheets-Sheet 3

Inventors:
Francis H. Bowman,
Edward Lynch,
David R. Price,
by Charles E. Mullen
Their Attorney.

Patented Aug. 11, 1931

1,818,787

UNITED STATES PATENT OFFICE

FRANCIS H. BOWMAN, OF SWAMPSCOTT, MASSACHUSETTS, EDWARD LYNCH, OF RIO DE JANEIRO, BRAZIL, AND DAVID R. PRICE, OF LYNN, MASSACHUSETTS, ASSIGNORS TO GENERAL ELECTRIC COMPANY, A CORPORATION OF NEW YORK

SYNCHRONOSCOPE

Application filed September 16, 1929. Serial No. 393,095.

Our invention relates to synchronoscopes and has for its objects to provide a low cost, rugged instrument of this character which will respond to a comparatively wide difference in voltage and frequency between the two machines to be synchronized. Another object of our invention is to provide a synchronoscope requiring a small volt ampere consumption such that it may be energized through condenser type bushing transformers or other translating devices of low volt ampere rating. Another object of our invention is to provide a synchronoscope which requires only one polyphase energizing winding together with an arrangement requiring a lesser number of circuit connections to the machines to be synchronized than with previous devices of this character.

Figure 4:
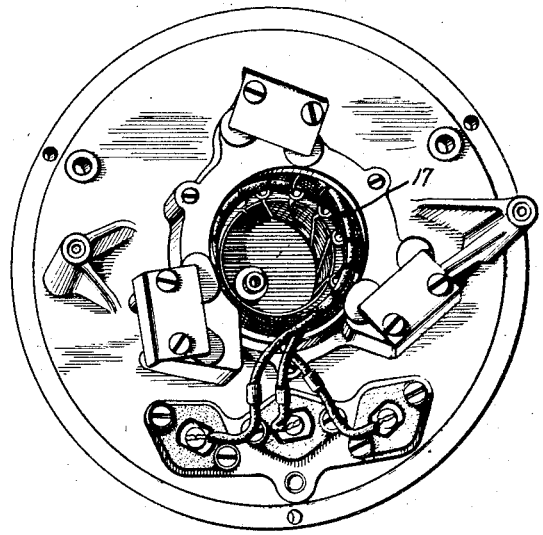
Figure 5:
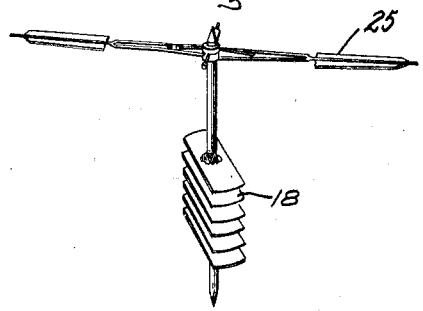
Figure 6:
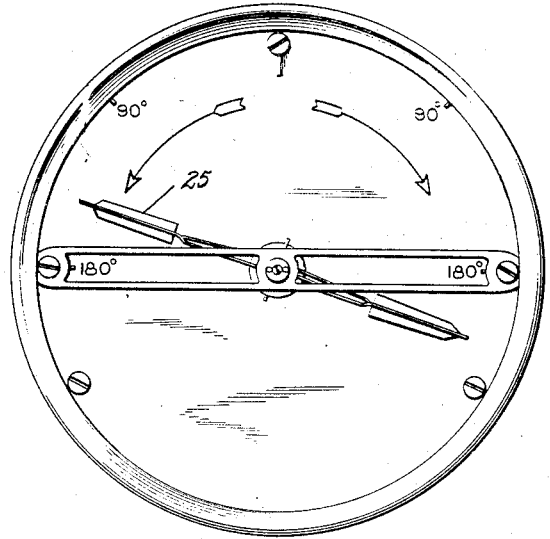
Figure 7:
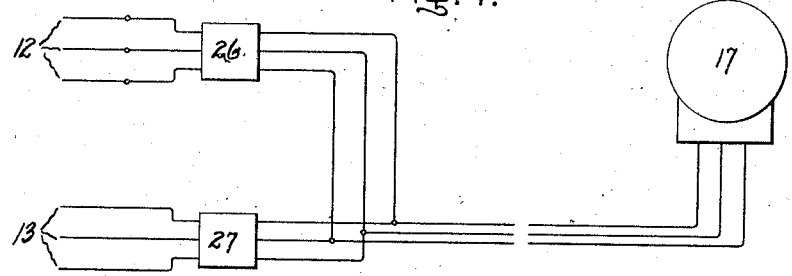
Figure 8:
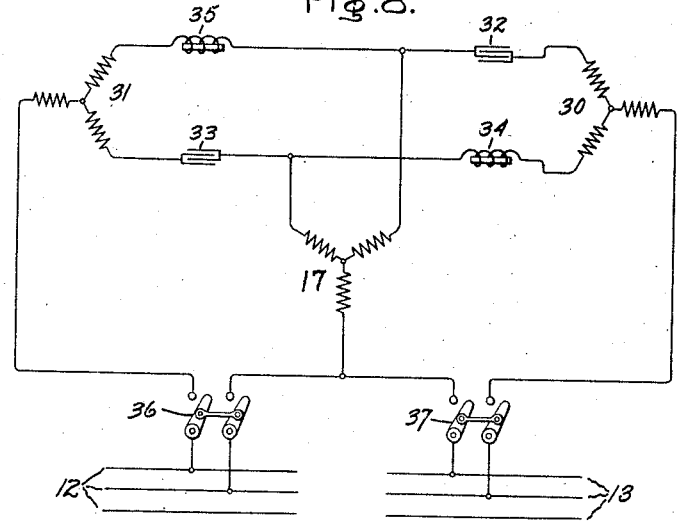

The features of our invention which are believed to be novel and patentable will be pointed out in the claims appended hereto. For a better understanding of our invention reference is made in the following description to the accompanying drawings in which Fig. 1 represents explanatory synchronizing connections between generators to be synchronized and synchronoscope apparatus including the synchronoscope of our invention; Figs. 2 and 3 represent the synchronoscope apparatus of Fig. 1 for different out-of-phase energizing conditions; Figs. 4 and 5 respectively show the commercial form of stator and rotor parts of the synchronoscope; Fig. 6 shows a face view and the scale arrangement of the synchronoscope; Fig. 7 shows circuit connections between two systems and the remotely located synchronoscope of our invention and Fig. 8 shows a phase splitting arrangement which permits the use of our synchronoscope where only two connections are necessary to the lines to be synchronized.

Referring to Fig. 1, we have represented at 10 and 11 two polyphase generators supplying lines 12 and 13 respectively together with a switch 14 which may be closed to connect the generators in parallel when they are in synchronism. For the sake of simplicity in explaining the invention the two generators are represented as three-phase bipolar machines with the rotor fields shown at 15 and 16 rotating in the same direction. We will assume for the moment that the speeds and voltages of the two machines are the same and since the rotors have the same angular relation with respect to the stator windings the two machines are in condition to be synchronized by closing the switch 14.

One modification of the synchronoscope embodying our invention is diagrammatically represented at 17 and comprises a single bipolar polyphase stator winding and a magnetic bipolar rotor 18. It will be noted that this stator winding is connected to the line 13 through resistances 19 and to the line 12 through resistances 20. The connection to the line 12 is such as to give the synchronoscope the same phase rotation as generator 10 but the connection to line 13 is such as to give the synchronoscope an opposite phase rotation to that of generator 11. The resistances 19 and 20 are sufficiently high to reduce the voltages on the synchronoscope winding to desired low values and to prevent appreciable short-circuit currents flowing between the lines 12 and 13. The energy conveyed to the stator winding of the synchronoscope through either line connection alone is insufficient to cause the rotor 18 to revolve as a motor.

Clockwise and counterclockwise rotating magnetic fields are simultaneously induced in the synchronoscope 17 and produce a resultant magnetic field which is sufficient to move the rotor 18 into line therewith. When the two lines 12 and 13 have the same frequency the resultant effective magnetic field of the synchronoscope is stationary and is produced whenever the two rotating magnetic fields coincide in space and polarity. This will occur twice per cycle. Thus there is produced a resultant pulsatory magnetization in a vertical direction twice per cycle under the conditions assumed which is effective to maintain the polar rotor 18 of the device in a vertical position. This synchronous indicating position is determined by the position of the stator phase winding of the synchronoscope which is connected to the same phase of the two lines 12 and 13.

In the above discussion it was assumed that the two lines 12 and 13 were in synchronism, i. e., have the same frequency and phase angular relation. Previous to a synchronizing operation the frequencies may be different or the frequencies may be the same, but the phase relation may be different. If the synchronoscope is to be useful it must show these conditions as well as that of synchronism.

In Figs. 2 and 3, 21 represents a three-phase stator which if connected to lines 12 of Fig. 1 will produce a field represented by arrow 23. Similarly, 22 represents a stator which if connected to lines 13 will produce a field represented by arrow 24. These elements will be helpful in explaining the operation of the synchronoscope 17 under different conditions. In Fig. 2 the parts represent a 90 degree out-of-phase condition of the two lines 12 and 13. If the frequency is the same the arrows 23 and 24 representative of the two rotating fields in 17 will coincide in direction twice per cycle on a line corresponding to the position of rotor 18. Consequently this position of the rotor will indicate the 90 degree out-of-phase condition of the two lines as well as the direction of the out-of-phase condition. For example, it will indicate that the phase of line 12 must be advanced or that the phase of line 13 must be retarded to bring about a condition of synchronism.

In Fig. 3 the two rotating magnetic fields are represented 180° out-of-phase. The two rotating magnetic fields will therefore coincide in direction twice per cycle along a horizontal axis and the position of rotor 18 will indicate this condition. If the phase of line 12 is now retarded another 180 degrees, rotor 18 will again be in a vertical position but just reversed to that shown in Fig. 1, again indicating a condition of synchronism.

Having thus explained how the device indicates the phase conditions when the frequencies of the two lines are the same it is easy to see that the position of rotor 18 will continually change if the frequencies are not the same. For example if the frequency of line 12 is low with respect to that of line 13 the rotor will rotate in a counterclockwise direction to follow the changing positions of the points of coincidence of the arrows. This speed of rotation will be equal to one-half the difference in the two frequencies. Thus if line 13 is at 60 cycles and line 12 at 50 cycles, the difference in frequency will be 10 cycles per second and the rotor 18 will rotate in a counterclockwise direction at 5 revolutions per second. It thus becomes apparent how the device indicates difference in frequency and phase relation. In the practical design of this instrument the exciting current and torque are made insufficient for the rotor to follow the rapidly rotating field produced by one line alone and therefore the device will not motor if connected to only one line or if one line only is energized when the instrument is connected to both. However, it will operate as a synchronoscope for quite wide difference in voltages of the two lines when both are energized. These are desirable features and advantages of our device not only from the standpoint of its use as a synchronoscope but also from the standpoint of low volt ampere consumption. Our device will operate with less than 10 volt amperes drawn from each line and may therefore be operated through vacuum tubes or condenser type bushings, thus requiring a less expensive installation than if inductive transformers were employed between the high voltage lines and synchronoscope. The device will operate continuously without heating and may be left connected to the lines without injury.

Due to the fact that the resultant effective magnetic field of the synchronoscope rotates at only one-half the speed corresponding to the differences in frequency and is the product of two voltages the rotor is able to follow this relatively low speed resultant field for quite wide differences in voltage and frequency. The device therefore has good torque and range when used for the purpose intended.

It will be apparent to those skilled in the art that the stator winding of the device may connected in mesh or in star and that separate windings might be used for connection to the two systems if similarly wound on the stator.

Fig. 4 shows the stator element of the commercial device with the face and rotor removed. Fig. 5 shows the preferred form of rotor element. The polar rotor structure 18 shown preferably comprising spaced polar magnetic sections of a high permeability, low hysteresis material for lightness and efficiency. While the essential requisite of this rotor is that it shall be of a polar magnetic structure, the particular structure represented which is made from some material having high permeability and low hysteresis loss improves the operation and reduces the volt ampere consumption. One material of this character wich we have employed to advantage in the device is the nickel-iron alloys described in United States Patents 1,586,883 and 1,586,884 to Elmen, June 1, 1926, but of course we do not wish to limit our invention in this respect.

Fig. 6 shows a face view of the synchronoscope. The reason for the balanced double ended pointer 25 will be clear from the previous description of the operation. Only the upper half of the scale is used and the lower half may be covered over if desired. The condition of the phase relation is indicated by the position of the pointer 25, whichever end happens to be up, and the difference in frequency, if any, is indicated by the direction and rate of rotation of the pointer. When the pointer is vertical and is stationary the two machines or lines to which the device is connected are in synchronism.

The low volt ampere consumption of the device and the fact that only three circuit connections are required to the device are of considerable advantage, particularly where it is desired to place it at a remote distance from the machines or lines to be synchronized as in remote control systems. This advantage is represented in Fig. 7 where the translating devices indicated at 26 and 27 between the lines 12 and 13 and the common connection to the sychronoscope 17 may be any suitable devices or combination of devices serving to reduce the voltages and prevent short circuit conditions between the lines 12 and 13.

The three phase line between the common connection and the synchronoscope may be several miles in length.

In Fig. 8 phase splitting devices comprising suitable reactances, resistances and condensers are connected between a phase of each of the lines 12 and 13 to be synchronized and two of the terminals of the synchronoscope 17. The three branches of the resistances shown at 30 and 31 are equal and in the commercial form of our device these three branch resistances are made approximately 175 ohms each. The condensers shown at 32 and 33 are then of about 3 microfarads each and the reactances at 34 and 35 each comprise an iron core reactor of approximately 1350 turns. The phase splitting devices and synchronoscope are connected to the lines 12 and 13 through suitable switches 36 and 37. It will be noted that one phase from line 12 goes through switch 36 to the resistance 31. Here the circuit is split, one part going through reactance 35 to one terminal of the synchronoscope and the other part going through condenser 33 to another terminal of the synchronoscope. The phase of the current going through the reactance is lagged approximately 60 degrees and the current in the condenser path is advanced by about the same angle. The current from line 12 through the phase splitting device is thus divided into two components 120 degrees apart in phase and these components combine in the third phase of winding 17 to produce a resultant which is 120 degrees from both the other components.

The current from line 13 through the other phase splitting branches is similarly treated but in the reverse phase rotating relation.

The third terminal of the synchronoscope is connected in multiple to two other phases of lines 12 and 13. The operation of the device is as previously described. The phase splitting arrangement saves bringing three circuits from each three phase line and where the synchronoscope is to be located some distance from the high tension lines this is a distinct advantage.

We do not wish to limit our invention to the particular construction and circuit connections hereinbefore described but seek to include in the scope of the appended claims such other modifications and connecting arrangements as fall fairly within the true spirit and scope of our invention.

What we claim as new and desire to secure by Letters Patent of the United States, is:

1. In combination with two alternating current lines, means for determining the condition of synchronism between said lines comprising a stator element provided with a polyphase winding, means for connecting said winding in parallel to both of said lines but in reversed phase rotation, said connecting means including means for reducing the voltage between the lines and stator element and preventing short circuit currents from flowing between the lines, and a polar rotor element influenced by the resultant magnetic field produced in said stator element.

2. A synchronoscope having polyphase terminals, a polyphase line and circuit connections between said terminals and line including phase splitting means for reducing the number of necessary line connections to less than the number of polyphase terminals on the synchronoscope.

3. A synchronoscope having a three-phase winding and terminals, a three-phase line, and circuit connections between said terminals and line including phase splitting means for reducing the number of necessary line connections to two.

4. A synchronoscope having a three-phase winding and terminals the latter being referred to for convenience as 1, 2 and 3, a pair of three-phase lines to be synchronized, circuit connections between said terminals and two of the phases of each three-phase line comprising a direct parallel connection from terminal 1 to one of said two phases of each three-phase line, a phase splitting device connected between the other phase of one line and terminals 2 and 3 so as to advance the phase on terminal 2 and retard it on terminal 3, and a second phase splitting device connected between the other phase of the other line and terminals 2 and 3 so as to retard the phase on terminal 2 and advance the phase on terminal 3.

In witness whereof we have hereunto set our hands this second day of August 1929, this 26th day of August 1929 and this second day of August 1929 respectively.

FRANCIS H. BOWMAN.
EDWARD LYNCH.
DAVID R. PRICE.